(12) United States Patent
Watakabe et al.

(10) Patent No.: US 8,263,710 B2
(45) Date of Patent: *Sep. 11, 2012

(54) SOLID POLYMER ELECTROLYTE MATERIAL, LIQUID COMPOSITION, SOLID POLYMER FUEL CELL AND FLUOROPOLYMER

(75) Inventors: Atsushi Watakabe, Kanagawa (JP);
Takeshi Eriguchi, Kanagawa (JP);
Toshihiro Tanuma, Kanagawa (JP);
Yasuhiro Kunisa, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,273

(22) Filed: Aug. 22, 2011

(65) Prior Publication Data

US 2011/0305971 A1    Dec. 15, 2011

Related U.S. Application Data

(60) Continuation of application No. 11/671,665, filed on Feb. 6, 2007, now Pat. No. 8,043,763, which is a division of application No. 10/025,763, filed on Dec. 26, 2001, now Pat. No. 7,220,508.

(30) Foreign Application Priority Data

Dec. 26, 2000 (JP) ................................ 2000-395511

(51) Int. Cl.
*C08F 14/18* (2006.01)
*C08F 16/24* (2006.01)

(52) U.S. Cl. ........ 525/276; 526/242; 526/247; 429/479; 429/494; 429/523; 429/530

(58) Field of Classification Search .................. 429/479, 429/494, 523, 530; 525/276; 526/242, 247
See application file for complete search history.

(56) References Cited

U.S. PATENT DOCUMENTS

| 4,399,264 A | 8/1983 | Squire |
| 4,433,082 A | 2/1984 | Grot |
| 4,897,457 A | 1/1990 | Nakamura et al. |
| 4,935,477 A | 6/1990 | Squire |
| 5,495,028 A | 2/1996 | Navarrini et al. |
| 5,646,223 A | 7/1997 | Navarrini et al. |
| 5,684,192 A | 11/1997 | Stone et al. |
| 5,795,668 A | 8/1998 | Banerjee |
| 6,100,324 A | 8/2000 | Choi et al. |
| 6,156,451 A | 12/2000 | Banerjee et al. |
| 6,395,848 B1 | 5/2002 | Morgan et al. |
| 6,610,789 B2 | 8/2003 | Watakabe et al. |
| 2010/0304271 A1 | 12/2010 | Hommura et al. |
| 2011/0027687 A1 | 2/2011 | Hommura et al. |
| 2011/0027688 A1 | 2/2011 | Hommura et al. |

FOREIGN PATENT DOCUMENTS

| EP | 0 073 087 A1 | 3/1983 |
| EP | 0 345 964 A1 | 12/1989 |
| EP | 0 937 720 A1 | 8/1999 |
| EP | 1 091 435 | 4/2001 |
| EP | 1 176 655 A1 | 1/2002 |
| EP | 1 209 197 A1 | 5/2002 |
| JP | 1-131215 | 5/1989 |
| JP | 4-189880 | 7/1992 |
| JP | 7-70107 | 3/1995 |
| JP | 2001-200019 | 7/2001 |
| JP | 2003-505569 | 2/2003 |
| WO | 99/59216 | 11/1999 |
| WO | 00/38261 | 6/2000 |
| WO | 00/67336 | 11/2000 |

OTHER PUBLICATIONS

Official Communication issued Oct. 20, 2011 in European Patent Application No. 01130538.0-1227.
Ingo Pinnau, et al., "Gas and vapor transport properties of amorphous perfluorinated copolymer membranes based on 2,2-bistrifluoromethyl-4,5-difluoro-1,3-dioxole/tetrafluoroethylene", Journal of Membrane Science 109 (1996), 1996, pp. 125-133.

*Primary Examiner* — Tracy Dove
(74) *Attorney, Agent, or Firm* — Oblon, Spivak, McClelland, Maier & Neustadt, L.L.P.

(57) ABSTRACT

A solid polymer electrolyte material made of a copolymer comprising a repeating unit based on a fluoromonomer A which gives a polymer having an alicyclic structure in its main chain by radical polymerization, and a repeating unit based on a fluoromonomer B of the following formula (1):

$$CF_2=CF(R^f)_j SO_2X \qquad (1)$$

wherein j is 0 or 1, X is a fluorine atom, a chlorine atom or OM {wherein M is a hydrogen atom, an alkali metal atom or a group of $NR^1R^2R^3R^4$ (wherein each of $R^1$, $R^2$, $R^3$ and $R^4$ which may be the same or different, is a hydrogen atom or a monovalent organic group)}, and $R^f$ is a $C_{1-20}$ polyfluoroalkylene group having a straight chain or branched structure which may contain ether oxygen atoms.

16 Claims, No Drawings

SOLID POLYMER ELECTROLYTE MATERIAL, LIQUID COMPOSITION, SOLID POLYMER FUEL CELL AND FLUOROPOLYMER

This is a continuation application of U.S. application Ser. No. 11/671,665, filed Feb. 6, 2007, now U.S. Pat. No. 8,043,763, which is a divisional application of U.S. application Ser. No. 10/025,763, filed Dec. 26, 2001, now U.S. Pat. No. 7,220,508, issued May 22, 2007.

The present invention relates to a solid polymer electrolyte material, a liquid composition, a solid polymer fuel cell and a fluoropolymer which can be applied thereto.

A solid polymer fuel cell is expected to be practically used as a power source for a vehicle such as an electric car or for a small size cogeneration system, since high levels of cell performance can be obtained, and the weight reduction and the size reduction are easy. With a solid polymer fuel cell which is presently being studied, the operation temperature range is low, and its exhaust heat can hardly be utilized. Accordingly, a performance is required whereby it is possible to obtain a high power generation efficiency and a high output density under such an operational condition that the utilization ratio of the anode reaction gas such as hydrogen and the utilization ratio of the cathode reaction gas such as air, are high.

Heretofore, with respect to a solid polymer fuel cell, it has been attempted to improve the cell output by a so-called three-dimensional modification of the reaction site in the catalyst layer by using fine particles of a catalyst such as a metal-carrying carbon black coated with an ion exchange resin of the same type as or a different type from the polymer electrolyte membrane, as a material constituting the electrode catalyst layer.

However, under the above-mentioned operational conditions where the reaction rate of the cell reaction is relatively high, the amount of water moving together with protons which move in the polymer electrolyte membrane from an anode to a cathode, and the amount of water formed and condensed by the electrode reaction of the cathode, will increase. Therefore, a so-called flooding phenomenon, i.e. a phenomenon wherein such water is not readily discharged from the cathode to the exterior, and pores for supplying the reaction gas, formed in the catalyst layer of the cathode, are clogged by such water, was likely to occur. If such flooding occurs, supply of the cathode reaction gas to the reaction site of the catalyst layer will be prevented, whereby the desired cell output can hardly constantly be obtained. Therefore, in order to improve the cell output and to obtain such an output constantly, it is necessary to improve the water repellency and the gas diffusion property without lowering the ionic conductivity in the electrode catalyst layer.

Whereas, if it is intended to secure water repellency and gas diffusion property in the catalyst layer by reducing the ion exchange capacity (hereinafter referred to as $A_R$) of the ion exchange resin in the catalyst layer, the water content of the ion exchange resin tends to be low, whereby the ionic conductivity will decrease, and the cell output will decrease. Further, in such a case, the gas permeability of the ion exchange resin will also decrease, whereby the supply of the gas to be supplied to the reaction site tends to be deficient. Consequently, the concentration overvoltage will increase, and the cell output will decrease.

On the other hand, if it is intended to improve the ionic conductivity and the gas permeability by increasing $A_R$ of the ion exchange resin contained in the catalyst layer, the water content of the ion exchange resin will increase, whereby flooding is likely to occur, and it has been difficult to obtain high cell output constantly.

Therefore, JP-A-5-36418 proposes a solid polymer fuel cell wherein a fluoropolymer or the like, such as a polytetrafluoroethylene (hereinafter referred to as PTFE) a tetrafluoroethylene/hexafluoropropylene copolymer or a tetrafluoroethylene/perfluoro(alkyl vinyl ether) copolymer is incorporated as a water repellent agent, in the cathode catalyst layer. In this specification, "an A/B copolymer" means a copolymer comprising a repeating unit based on A and a repeating unit based on B.

Further, JP-A-7-211324 proposes a solid polymer fuel cell wherein fluorinated pitch is incorporated together with PTFE in the cathode catalyst layer. Further, JP-A-7-192738 proposes a method wherein the catalyst surface is fluorinated, which is used to form a cathode catalyst layer of a solid polymer fuel cell. Still further, JP-A-5-251086 and JP-A-7-134993 propose a method of letting the water repellency have a gradient in the thickness direction of the electrode.

However, if a water repellent agent is incorporated to a catalyst layer as in the solid polymer fuel cell disclosed in JP-A-5-36418, there has been a problem such that the electrical resistance of the cathode increases due to the insulating property of the water repellent agent, or the gas diffusion property of the catalyst layer is damaged due to an increase of the thickness of the catalyst layer, whereby the polarization characteristics of the cathode at the initial stage of start-up tend to be worse, and the cell output can not be improved. Further, if it is attempted to increase the cell output by reducing the content of the water repellent agent in the catalyst layer, the water repellency in the catalyst layer decreases, whereby there has been a problem that the polarization characteristics of the electrode will be damaged in a relatively short period of time after the start-up, and further, flooding is likely to occur.

Further, with the solid polymer fuel cell as disclosed in JP-A-7-211324 or JP-A-7-192738, it is difficult to uniformly cover the surface of the catalyst to be incorporated in the catalyst layer, with an ion exchange resin, whereby there has been a problem such that adequate reaction site corresponding to the amount of the catalyst incorporated to the cathode catalyst layer can not be secured, and a high cell output can not be obtained constantly. Further, the solid polymer fuel cell as disclosed in JP-A-5-251086 or JP-A-7-134993 had a problem that the production process tends to be cumbersome.

And, the above-mentioned problems in securing good gas diffusion property and water repellency in the catalyst layer of a gas diffusion electrode have become important also in an application of the gas diffusion electrode to another electrochemical process such as electrolysis of water or sodium chloride for improvement of the efficiency of the process by improving the polarization characteristics.

Further, the solid polymer fuel cell which is presently studied, has a problem such that the operation temperature range is low at a level of from 60 to 90° C., whereby the exhaust heat can hardly be utilized. In an application to automobiles, a fuel cell which can be operated at a temperature higher than 100° C., is desired in order to reduce the catalyst poisoning by carbon monoxide contained in the fuel gas or to reduce the size of the cooling system.

At present, as an electrolyte for a solid polymer fuel cell, a copolymer of $CF_2=CFOCF_2CF(CF_3)O(CF_2)_nSO_3H$ (n=2 or 3) with tetrafluoroethylene, is mainly being studied. However, this resin has a softening point lower than 100° C., and the strength decreases at a high temperature of at least 100° C., whereby the fuel cell can hardly be operated at a high temperature of at least 100° C. Accordingly, as a material for a polymer electrolyte membrane especially for a fuel cell, an ion exchange resin is desired which has a softening point of at least 100° C. and which has a strength durable for use in a fuel cell. Further, a polymer electrolyte is contained usually in catalyst layers of an anode and a cathode, and such a polymer electrolyte is also desired to preferably have a softening temperature higher than the operation temperature from the viewpoint of the durability in a high temperature operation like the membrane material.

On the other hand, for example, a copolymer of $CF_2=CFOCF_2CF_2SO_3H$ with tetrafluoroethylene is known to have a softening temperature higher than 100° C. (ACS Symp. Ser. (1989), Vol. 395, pp 370-400). However, the production cost is high, and it is difficult to produce it on an industrial scale.

The present invention has been made in view of the above problems of the prior art, and it is an object of the present invention to provide a fluoropolymer excellent in the ionic conductivity, water repellency and gas permeability, and a solid polymer electrolyte material made thereof, a liquid composition containing such a solid polymer electrolyte material and a solid polymer fuel cell containing such a solid polymer electrolyte material as a constituting material, whereby high electric output can constantly be obtained. Further, it is an object of the present invention to provide a solid polymer electrolyte material having a softening temperature higher than ever, in order to make it possible to operate the solid polymer fuel cell at a temperature higher than ever.

The present inventors have conducted an extensive research to accomplish the above objects and, as a result, have found that a fluorosulfonic polymer having an alicyclic structure in the polymer has high ionic conductivity, and when it is used as a solid polymer electrolyte material for an electrode catalyst layer in a solid polymer fuel cell, it is possible to improve the output of the fuel cell while securing adequate ionic conductivity in the catalyst layer. The present invention has been accomplished on the basis of this discovery. Further, the present inventors have found that the above-mentioned fluorosulfonic polymer having an alicyclic structure has a softening point higher than the conventional sulfonic polymer and is a material suitable for a high temperature operation of the solid polymer fuel cell.

Thus, the present invention provides a solid polymer electrolyte material made of a copolymer comprising a repeating unit based on a fluoromonomer A which gives a polymer having an alicyclic structure in its main chain by radical polymerization, and a repeating unit based on a fluoromonomer B of the following formula (1):

$$CF_2=CF(R^f)_jSO_2X \quad (1)$$

Here, in the formula (1), j is 0 or 1, and X is a fluorine atom, a chlorine atom or a group of OM. And, M in the group of OM is a hydrogen atom, an alkali metal atom or a group of $NR^1R^2R^3R^4$. Further, each of $R^1$, $R^2$, $R^3$ and $R^4$ in the group of $NR^1R^2R^3R^4$, which may be the same or different, is a hydrogen atom or a monovalent organic group, preferably a hydrogen atom or a $C_{1-4}$ alkyl group. Further, $R^f$ is a $C_{1-20}$ polyfluoroalkylene group having a straight chain or branched structure which may contain ether oxygen atoms.

Further, in this specification, "a solid polymer electrolyte material" includes its precursor. That is, the solid polymer electrolyte material includes not only an ion conductive fluoropolymer having the —$SO_3M$ group in its molecule when X in the —$SO_2X$ group in the formula (1) is the above OM, but also a fluoropolymer having in its molecule a —$SO_2F$ group or a —$SO_2Cl$ group which is a precursor for the —$SO_3M$ group. In a case where the solid polymer electrolyte material of the present invention is a fluoropolymer having in its molecule a —$SO_2F$ group or a —$SO_2Cl$ group, such a polymer may be subjected to hydrolytic treatment with e.g. an aqueous solution of a base to convert it to an ion conductive fluoropolymer to having a —$SO_3M$ group in its molecule, which is useful as a solid polymer electrolyte material.

Accordingly, when the ionic conductivity of the solid polymer electrolyte material of the present invention is discussed in the following description, if the obtainable solid polymer electrolyte material is a fluoropolymer having in its molecule a —$SO_2F$ group or a —$SO_2Cl$ group by X in the formula (1), it means the ionic conductivity of an ion conductive fluoropolymer having a —$SO_3M$ group in its molecule, obtained by hydrolytic treatment thereof.

Further, in the present invention, "a fluoromonomer A which gives a polymer having an alicyclic structure in its main chain" means a monomer which becomes a polymer having an alicyclic structure in its main chain by radical polymerization. Specifically, it includes two types, i.e. a monomer having an alicyclic structure in its molecule and a monomer for cyclopolymerization which has no alicyclic structure in its molecule but which forms an alicyclic structure as the polymerization reaction proceeds. Further, "having an alicyclic structure in its main chain" means that at least one of carbon atoms of the alicyclic structure in the repeating unit is co-owned by the main chain.

The solid polymer electrolyte material of the present invention is considered to have high gas permeability, since it has a repeating unit based on the above fluoromonomer A. Further, it has high ionic conductivity, since it has a repeating unit based on the fluoromonomer B having a —$SO_2X$ group. Further, fluorine atoms bonded to the carbon chain in such repeating units, contribute to the water repellency. Accordingly, if the solid polymer electrolyte material of the present invention is used as a constituting material for an electrode catalyst layer in a solid polymer fuel cell, the gas permeability can be improved over a conventional material while maintaining high ionic conductivity and water repellency in the catalyst layer, whereby the cell output will be improved, and yet, flooding will effectively be prevented, whereby such a high output can be obtained constantly.

The mechanism whereby the solid polymer fuel cell employing the solid polymer electrolyte material of the present invention in an electrode catalyst layer provides such a high output, is not clearly understood, but it is considered attributable to the alicyclic structure contained in the repeating unit based on the fluoromonomer A in the solid polymer electrolyte material. Namely, it is considered that due to the alicyclic structure, the solid polymer electrolyte material will be amorphous, whereby the gas permeability will be improved over the conventional solid polymer electrolyte material. Further, a gas diffusion electrode provided with a catalyst layer containing the solid polymer electrolyte of the present invention as a constituting material, or a polymer electrolyte membrane formed from the solid polymer electrolyte material of the present invention, is useful not only for a solid polymer fuel cell but also for an electrochemical process such as electrolysis of sodium chloride.

Further, the present invention provides a liquid composition characterized in that a solid polymer electrolyte material which is the above-mentioned solid polymer electrolyte material and wherein the —$SO_2X$ group in the repeating unit based on the fluoromonomer B is a —$SO_3M$ group, is dissolved or dispersed in an organic solvent having a hydroxyl group in its molecule. Here, M has the same meaning as M in the formula (1). The above liquid composition may contain water. When the boiling point of the above organic solvent is lower than the boiling point of water, by adding water to the liquid composition and distilling the organic solvent off, it is possible to obtain a liquid composition having the above-mentioned solid polymer electrolyte material dissolved or dispersed in water, which contains substantially no organic solvent.

Among solid polymer electrolyte materials of the present invention, a material wherein the —$SO_2X$ group is a —$SO_3M$ group, can be dissolved or well dispersed in the organic solvent having a hydroxyl group in its molecule. For example, if a liquid having fine particles of a catalyst dispersed in a liquid composition obtainable by dissolving or dispersing in the above organic solvent a material having a —$SO_3H$ group among solid polymer electrolyte materials of the present invention, is used, a catalyst layer for a solid polymer fuel cell can easily be formed, and a catalyst layer excellent in gas permeability can be provided.

Further, the present invention provides a solid polymer fuel cell comprising an anode, a cathode and a polymer electrolyte membrane disposed between the anode and the cathode, wherein the cathode contains, as a constituting material, a solid polymer electrolyte material wherein the fluoromonomer B has a —$SO_3H$ group among the above-mentioned electrolyte materials.

The reason why the solid polymer fuel cell using the solid polymer electrolyte material of the present invention as a constituting material for the catalyst layer of the cathode, is capable of providing a high cell output constantly over a long period of time, is considered to be such that the diffusibility of oxygen gas is improved while the ionic conductivity and water repellency in the catalyst layer of the cathode are adequately secured, whereby the oxygen concentration over-potential will be reduced, and flooding will effectively be prevented.

Further, the solid polymer electrolyte material of the present invention has an alicyclic structure in its main chain and thus has a softening temperature higher than the conventional sulfonic acid polymer, and it is thus suitable for a high temperature operation of a fuel cell.

Further, the present invention provides a fluoropolymer which is a copolymer consisting essentially of a repeating unit of the following formula (I) and a repeating unit based on a fluoromonomer D of the following formula (II), wherein the content of the repeating unit based on the fluoromonomer D is from 10 to 75 mol %, and the number average molecular weight is from 5,000 to 5,000,000:

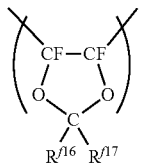
(I)

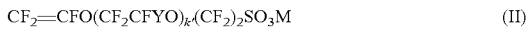
(II)

Here, in the formulae (I) and (II), each of $R'^{16}$ and $R'^{17}$ which may be the same or different, is a fluorine atom or a trifluoromethyl group, k' is 0 or 1, Y is a fluorine atom or a trifluoromethyl group, and M has the same meaning as M in the formula (1).

Further, the present invention provides a fluoropolymer which is a copolymer consisting essentially of a repeating unit based on perfluoro(3-butenyl vinyl ether) and a repeating unit based on a fluoromonomer D of the above formula (II), wherein the content of the repeating unit based on the fluoropolymer D is from 10 to 75 mol %, and the number average molecular weight is from 5,000 to 5,000,000.

Further, the present invention provides a fluoropolymer which is a copolymer consisting essentially of a repeating unit based on perfluoro(2-methylene-4-methyl-1,3-dioxolane) and a repeating unit based on a fluoropolymer D of the above formula (II), wherein the content of the repeating unit based on the fluoropolymer D is from 10 to 75 mol %, and the number average molecular weight is from 5,000 to 5,000,000.

These fluoropolymers of the present invention are those having particularly high gas permeability, among solid polymer electrolyte materials of the present invention, and they also have high ionic conductivity. Further, fluorine atoms bonded to carbon chains in these repeating units, contribute to water repellency. Therefore, such fluoropolymers of the present invention are useful as constituting materials for the gas diffusion electrodes or polymer electrolyte membranes to be used for the above-mentioned electrochemical process.

In the fluoropolymer consisting essentially of the repeating unit of the formula (I) and the repeating unit based on the fluoromonomer D of the formula (II), if the content of the repeating unit based on the fluoromonomer D in the fluoropolymer is less than 10 mol %, the proton conductivity tends to be low, such being undesirable. On the other hand, if such a content exceeds 75 mol %, the gas diffusibility tends to be low, such being undesirable. For the same reason, the content of the repeating unit based on the fluoromonomer D in the copolymer, is more preferably from 15 to 60 mol %.

Further, if the number average molecular weight of this fluoropolymer is less than 5,000, the physical property such as the swelling degree tends to change with time, whereby the durability tends to be inadequate. On the other hand, if the number average molecular weight exceeds 5,000,000, preparation of a solution tends to be difficult. For the same reason, the number average molecular weight of the fluoropolymer is more preferably from 10,000 to 3,000,000.

Further, as for the fluoropolymer consisting essentially of the repeating unit based on perfluoro(3-butenyl vinyl ether) and the repeating unit based on the fluoromonomer D of the formula (II), from the same viewpoint as the above-mentioned fluoropolymer containing the repeating unit of the formula (I), the content of the repeating unit based on the fluoromonomer D in this fluoropolymer, is 10 to 75 vol %, and more preferably from 15 to 60 mol %. Further, the number average molecular weight of this fluoropolymer is 5,000 to 5,000,000, and also more preferably from 10,000 to 3,000,000.

Further, as for the fluoropolymer consisting essentially of the repeating unit based on perfluoro(2-methylene-4-methyl-1,3-dioxolane) and the repeating unit based on the fluoromonomer D of the formula (II), from the same viewpoint as the above-mentioned fluoropolymer containing the repeating unit of the formula (I), the content of the repeating unit based on the fluoromonomer D in this fluoropolymer, is 10 to 75 vol %, and more preferably from 15 to 60 mol %. Further, the number average molecular weight of this fluoropolymer is 5,000 to 5,000,000, and also more preferably from 10,000 to 3,000,000.

Now, the present invention will be described in detail with reference to an embodiment wherein the present invention is applied to a solid polymer fuel cell.

The solid polymer fuel cell of the present invention has a construction comprising an anode, a cathode and a polymer electrolyte membrane disposed between the anode and the cathode. Each of the cathode and the anode which are gas diffusion electrodes, comprises a gas diffusion layer and a catalyst layer adjacent to the gas diffusion layer. As the constituting material of the gas diffusion layer, a porous material having electron conductivity (such as a carbon cloth or carbon paper) is useful.

The catalyst layer of the cathode mainly contains the above-mentioned solid polymer electrolyte material (a —SO$_3$H type) of the present invention and a catalyst, in order to improve the cell output and in order to improve the gas diffusibility and secure good ionic conductivity and water repellency in the catalyst layer, whereby the high cell output can be obtained constantly.

The solid polymer electrolyte material of the present invention to be incorporated to the catalyst layer of the cathode, is made of a copolymer comprising the repeating unit based on the fluoromonomer A and the repeating unit based on the fluoromonomer B. both the fluoromonomer A and the fluoromonomer B are preferably perfluoromonomers. It is particularly preferred that the fluoromonomer B is a compound of the following formula (2), especially preferably a compound of the formula (6).

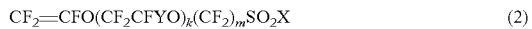 (2)

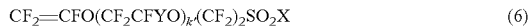 (6)

Here, in the formulae (2) and (6), k is an integer of from 0 to 2, m is an integer of from 1 to 12, k' is 0 or 1, Y is a fluorine atom or trifluoromethyl group, and X has the same meaning as X in the above formula (1). Thus, when both the fluoromonomer A and the fluoromonomer B are perfluoromonomers, the water repellency and durability of the resulting solid polymer electrolyte material will be improved. Further, when the fluoromonomer B is a compound of the formula (2), the resulting solid polymer electrolyte material will exhibits good ionic conductivity.

As mentioned above, the fluoromonomer A in the present invention specifically includes two types i.e. a monomer having an alicyclic structure in its molecule and a monomer for cyclopolymerization. The repeating unit based on the fluoromonomer A is preferably represented by any one of the following formulae (3) to (5):

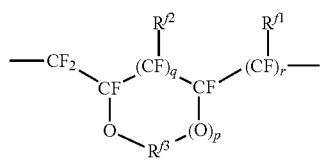 (3)

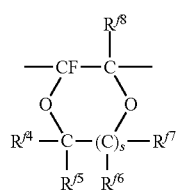 (4)

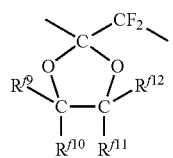 (5)

Here, in the formula (3) each of p, q and r which are independent of each other, is 0 or 1, each of $R^{f1}$ and $R^{f2}$ which may be the same or different, is a fluorine atom, a $C_{1-5}$ perfluoroalkyl group or a $C_{1-5}$ perfluoroalkoxy group, and $R^{f3}$ is a $C_{1-3}$ perfluoroalkylene group, which may have a $C_{1-5}$ perfluoroalkyl group or a $C_{1-5}$ perfluoroalkoxy group, as a substituent.

Further, in the formula (4), s is 0 or 1, each of $R^{f4}$, $R^{f5}$, $R^{f6}$ and $R^{f7}$ which may be the same or different, is a fluorine atom or a $C_{1-5}$ perfluoroalkyl group, and $R^{f8}$ is a fluorine atom, a $C_{1-5}$ perfluoroalkyl group or a $C_{1-5}$ perfluoroalkoxy group, provided that $R^{f4}$ and $R^{f5}$ may be connected to form a spiro ring when s=0.

Further, in the formula (5), each of $R^{f9}$, $R^{f10}$, $R^{f11}$ and $R^{f12}$ which may be the same or different, is a fluorine atom or a $C_{1-5}$ perfluoroalkyl group.

The structure of the repeating unit of the above formula (3) can be formed from the monomer for cyclopolymerization, and the perfluoroalkylene group represented by $R^{f3}$ may have a $C_{1-5}$ perfluoroalkyl group or a $C_{1-5}$ perfluoroalkoxy group bonded as a substituent. Further, when subjected to cyclopolymerization, in the formula (3), when q=0, r=1 and when q=1, r=0. Specifically, such a repeating unit includes, for example, those represented by the following formulae (7) to (22):

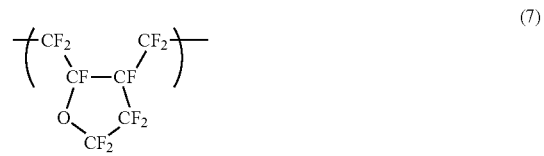 (7)

 (8)

 (9)

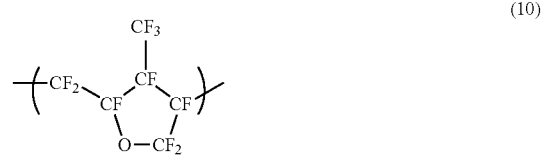 (10)

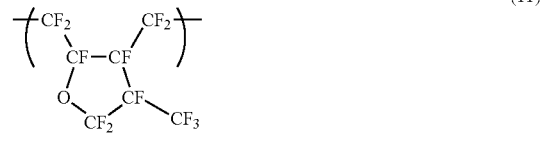 (11)

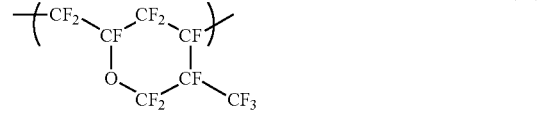 (12)

-continued

(13) 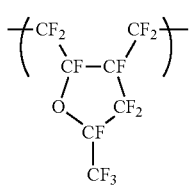

(14) 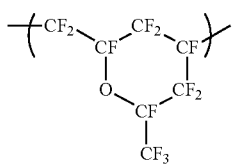

(15) 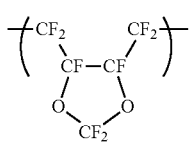

(16) 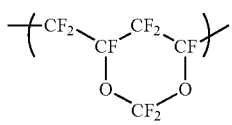

(17) 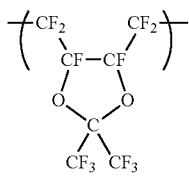

(18) 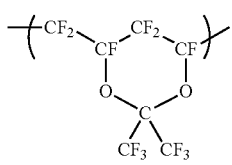

(19) 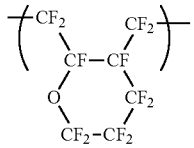

(20) 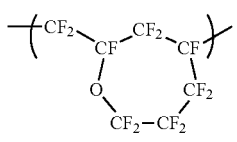

(21) 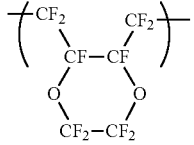

(22) 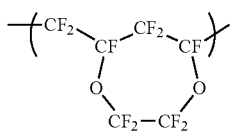

Further, the structure of the repeating unit of the above formula (4) can be formed from a monomer having an alicyclic structure in its molecule. Specifically, such a repeating unit includes, for example, those represented by the following formulae (23) to (32). Further, in a case where in the structure of the repeating unit of the formula (4), when the spiro ring formed by $R^{f4}$ and $R^{f5}$ when s=0, is a 4- to 6-membered ring, such a ring may contain an ether oxygen atom as an element constituting the ring, and such a ring may have a perfluoroalkyl group bonded as a substituent. Such a structure of the repeating unit based on the monomer having an alicyclic structure in its molecule, may, for example, be one represented by the following formula (33).

(23) 

(24) 

(25) 

(26) 

(27) 

(28) 

(29) 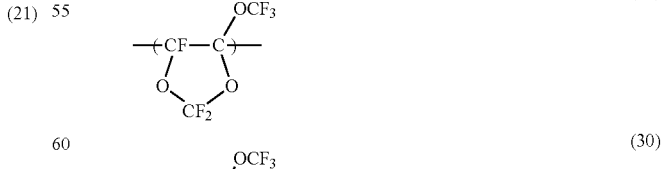

(30) 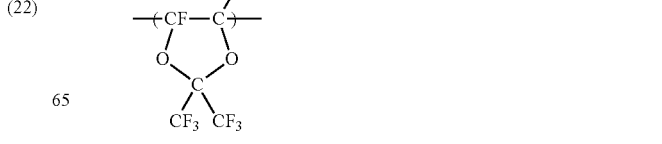

(31)

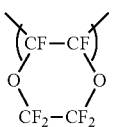

(32)

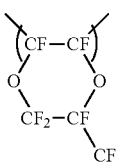

(33)

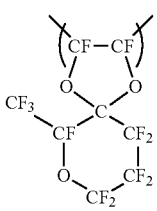

Further, the structure of the repeating unit of the above formula (5) can also be formed from a monomer having an alicyclic structure in its molecule. Specifically, such a repeating unit includes, for example, those represented by the following formulae (34) to (36).

(34)

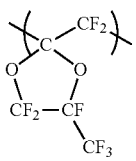

(35)

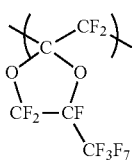

(36)

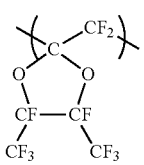

Among repeating units based on the fluoromonomer A, preferred is at least one member selected from the group consisting of repeating units of the formulae (7), (23), (24), (29) and (34). Monomers (fluoromonomers A) to be used as starting materials to introduce such repeating units into copolymers constituting solid polymer electrolyte materials, are, respectively, as follows. Formula (7): perfluoro(3-butenyl vinyl ether), formula (23): perfluoro(2,2-dimethyl-1,3-dioxole), formula (24): perfluoro(1,3-dioxole), formula (29): 2,2,4-trifluoro-5-trifluoromethoxy-1,3-dioxole, and formula (34): perfluoro(2-methylene-4-methyl-1,3-dioxolane).

A solid polymer electrolyte material made of a copolymer comprising such a repeating unit and a repeating unit based on the monomer of the above formula (6), is particularly preferred, since it has high ionic conductivity and is excellent in water repellency and oxygen permeability. Particularly when one having a —SO$_3$H group among the above copolymers, is incorporated to the catalyst layer of a cathode in a solid polymer fuel cell, the output of the resulting solid polymer fuel cell can be made higher than ever.

Among solid polymer electrolyte materials of the present invention, preferred is a fluoropolymer which is a copolymer consisting essentially of the repeating unit of the above formula (I) and the repeating unit based on the fluoromonomer D of the formula (II), wherein the content of the repeating unit based on the fluoromonomer D is from 10 to 75 mol %, and the number average molecular weight is from 5,000 to 5,000,000. Further, also preferred is a fluoropolymer which is a copolymer consisting essentially of the repeating unit based on perfluoro(3-butenyl vinyl ether) and the repeating unit based on the fluoromonomer D of the above formula (II), wherein the content of the repeating unit based on the fluoromonomer D is from 10 to 75 mol %, and the number average molecular weight is from 5,000 to 5,000,000. Still further, also preferred is a fluoropolymer which is a copolymer consisting essentially of the repeating unit based on perfluoro(2-methylene-4-methyl-1,3-dioxolane) and the repeating unit based on the fluoromonomer D of the above formula (II), wherein the content of the repeating unit based on the fluoromonomer D is from 10 to 75 mol %, and the number average molecular weight is from 5,000 to 5,000,000.

And, further, when the solid polymer electrolyte material of the present invention is used as an electrolyte material for a catalyst layer of a cathode in a solid polymer fuel cell as in this embodiment, if the —SO$_2$X groups in the copolymer comprising the repeating unit based on the fluoromonomer A and the repeating unit based on the fluoromonomer B, are other than —SO$_3$H groups, such a material is preliminarily subjected to acid form-conversion treatment to convert them to —SO$_3$H groups and then used. The hydrolytic treatment of the —SO$_2$F groups in the precursor may be carried out by using, for example, an aqueous solution of a base such as NaOH or KOH or a mixed solution of such a base in water and a water-soluble organic solvent to convert them to —SO$_3$Na groups or —SO$_3$K groups. Further, the acid form-conversion treatment may be carried out by using, for example, an aqueous solution of e.g. hydrochloric acid, nitric acid or sulfuric acid, to convert the —SO$_3$Na or —SO$_3$K groups to —SO$_3$H groups.

Further, the softening temperature of the copolymer as the solid polymer electrolyte material of the present invention is preferably at least 100° C. Here, the softening temperature of the solid polymer electrolyte material in the present invention, means a temperature at which the elastic modulus of the solid polymer electrolyte material starts to abruptly decrease when in an evaluation test of the dynamic viscoelasticity of the solid polymer electrolyte material, the elastic modulus is measured while gradually raising the temperature of the solid polymer electrolyte material from in the vicinity of room temperature. Accordingly, the softening temperature in the present invention is different from the glass transition temperature usually obtained from the value of tan δ and represents a temperature which is usually observed in a temperature region lower than the glass transition temperature.

Specifically, this softening temperature can be measured by a penetration method by means of a quartz probe having a diameter of 1 mm by using a thermal mechanical analyzer (TMA). Namely, the solid polymer electrolyte material to be measured is cast from its solution to form a film, and the quartz probe is contacted to this film in a direction normal to the film surface, and the temperature is raised at a temperature raising rate of from 1 to 10° C./min, whereby the temperature at which the thickness of the film starts to abruptly decrease, is measured as the softening temperature, as observed by the penetration of the probe into the film. It has been preliminarily confirmed that the value of the softening temperature obtained by this method agrees to the value of the temperature at which the abrupt decrease in the elastic modulus starts to be observed in the above-described profile of the temperature dependency of the elastic modulus of the polymer. Further, in a case where the load of the probe exerted to the film is too small, the thermal expansion of the film will be observed, but by optimizing the load, the degree of penetration of the probe at the softening temperature of the film, can be measured without any problem.

The operation temperature of a solid polymer fuel cell is usually at most 80° C. Therefore, if the softening temperature of the solid polymer electrolyte material contained in the catalyst layer is at least 100° C., a change with time in the physical property such as the swelling degree of the solid polymer electrolyte material in the catalyst layer during the operation of the cell, can be suppressed. Therefore, the durability of the solid polymer electrolyte material in the catalyst layer during the operation of the cell, will be improved. Further, if the solid polymer electrolyte material having a softening point of at least 100° C., is used as a material for the catalyst layer of the anode and for the polymer electrolyte membrane, in addition to the catalyst layer of the cathode, the durability of the electrolyte material in the catalyst layer of the anode or of the polymer electrolyte membrane, during the operation of the cell will be improved in the same manner as described above, and accordingly, the cell life can be improved.

Further, in such a case, by using the solid polymer electrolyte material having a softening point of at least 100° C. also for the polymer electrolyte membrane, the operational temperature of a conventional solid polymer fuel cell can be made higher than 80° C. It is thereby possible to effectively utilize the exhaust heat of the cell, and at the same time, the temperature control of the cell during the operation will be easier, since heat removal of the cell becomes easy. Further, in this case, it becomes possible to reduce the catalyst poisoning due to e.g. carbon monoxide contained in the anode reaction gas, and it becomes possible to improve the cell life also from this viewpoint. Further, also in a case where the solid polymer electrolyte material of the present invention is used as a solid acid catalyst, the softening temperature can be made high, whereby the reaction temperature can be made high, and the desired reaction can be proceeded in a higher temperature region.

In order to have a high softening temperature and have practical strength as a membrane, particularly preferred is a fluoropolymer which is a copolymer consisting essentially of a repeating unit of the formula (I), a repeating unit based on the fluoromonomer D of the formula (II) and a repeating unit based on tetrafluoroethylene, wherein the repeating unit of the formula (I) is from 10 to 70 mol %, preferably from 20 to 60 mol %, the repeating unit based on tetrafluoroethylene is from 10 to 70 mol %, preferably from 20 to 60 mol %, the content of the repeating unit based on the fluoromonomer D of the formula (II) is from 10 to 40 mol %, preferably from 10 to 30 mol %, and the number average molecular weight is from 5,000 to 5,000,000.

Further, the solid polymer electrolyte material of the present invention preferably has $A_R$ of from 0.5 to 2.5 meq/g dry resin (hereinafter simply represented by meq/g). If $A_R$ of the solid polymer electrolyte material is less than 0.5 meq/g, the water content of the solid polymer electrolyte material tends to decrease, and its ionic conductivity tends to be low, and if such a solid polymer electrolyte material is used as a constituting material for the catalyst layer of an electrode in a solid polymer fuel cell, it tends to be difficult to obtain an adequate cell output. On the other hand, if $A_R$ of the solid polymer electrolyte material exceeds 2.5 meq/g, the density of ion exchange groups in the solid polymer electrolyte material increases, whereby the strength of the solid polymer electrolyte material tends to be low. Further, if such a material is used as a constituting material for a catalyst layer of an electrode in a solid polymer fuel cell, the water content tends to be too high, whereby the gas diffusion or water drainage in the catalyst layer tends to be low, and flooding is likely to occur. For the same reason, $A_R$ of the solid polymer electrolyte material of the present invention is more preferably from 0.7 to 2.0 meq/g, still further preferably from 0.9 to 1.5 meq/g.

Further, the number average molecular weight of the solid polymer electrolyte material of the present invention is not particularly limited, and the degree of polymerization of the copolymer may be changed depending upon the particular purpose to suitably set the molecular weight. However, in a case where it is used as a constituting material for a catalyst layer of a cathode in a solid polymer fuel cell, as in the present embodiment, the number average molecular weight is preferably from 5,000 to 5,000,000, more preferably from 10,000 to 3,000,000. If the number average molecular weight of the solid polymer electrolyte material is less than 5,000, the physical property such as the swelling degree tends to change with time, whereby the durability tends to be inadequate. On the other hand, if the number average molecular weight exceeds 5,000,000, preparation of a solution tends to be difficult.

The ratio (mass ratio) of the repeating unit based on the fluoromonomer A to the repeating unit based on the fluoromonomer B in the solid polymer electrolyte material of the present invention is not particularly limited, and it may be suitably set depending upon the particular purpose. However, when the material is used as a constituting material for a catalyst layer of a cathode in a solid polymer fuel cell, as in the present embodiment, the ratio is preferably selected to meet the above range of $A_R$.

Further, to the solid polymer electrolyte material of the present invention, in addition to the repeating unit based on the fluoromonomer A and the repeating unit based on the fluoromonomer B, other repeating units may be incorporated as repeating units constituting the solid polymer electrolyte material, as the case requires, such as for adjustment of the mechanical strength. Monomers giving such other repeating units are not particularly limited, and, for example, tetrafluoroethylene, chlorotrifluoroethylene, vinylidene fluoride, hexafluoropropylene, trifluoroethylene, vinyl fluoride, ethylene and fluorovinyl compounds of the following formulae (37) to (40) may be mentioned. Further, for the purpose of improving the mechanical strength of the resulting copolymer, among these monomers, it is preferred to employ tetrafluoroethylene from the viewpoint of the high activity to the polymerization reaction, durability (perfluoro structure) and availability.

 (37)

 (38)

 (39)

 (40)

Here, in the formulae (37) and (38), $R^{f13}$ represents a $C_{1-12}$ perfluoroalkyl group. Further, in the formula (39), a is an integer of from 0 to 3, W is a fluorine atom or a trifluoromethyl group, and $R^{f15}$ is a $C_{1-12}$ perfluoroalkyl group having a straight chain or branched structure. Further, in the formula (40), $R^{f14}$ is a $C_{1-12}$ perfluoroalkylene group having a straight chain or branched structure, which may contain ether oxygen atoms, and Z is —CN, —COOR$^{f16}$ (wherein R$^{f16}$ is a $C_{1-6}$ alkyl group) or —COF.

Further, in a case where in addition to the repeating unit based on the fluoromonomer A and the repeating unit based on the fluoromonomer B, other repeating units are incorporated to the solid polymer electrolyte material of the present invention, the content of such other repeating units may suitably be determined depending upon the particular purpose of the solid polymer electrolyte material. In a case where the material is used as a constituting material for a catalyst layer of a cathode in a solid polymer fuel cell, as in the present embodiment, the content of such other repeating units in the copolymer constituting the solid polymer electrolyte material is preferably less than 35 mass %. If this value exceeds 35 mass %, the effect for increasing the output of the fuel cell tends to be small.

Further, among fluorovinyl ether compounds represented by the formula (39), it is preferred to employ fluorovinyl ether compounds of the following formulae (41) to (43). In the following formulae (41) to (43), b is an integer of from 1 to 8, d is an integer of from 1 to 8, and e is 2 or 3.

$$CF_2=CFO(CF_2)_bCF_3 \quad (41)$$

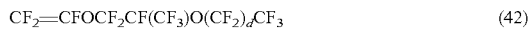

$$CF_2=CFOCF_2CF(CF_3)O(CF_2)_dCF_3 \quad (42)$$

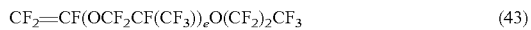

$$CF_2=CF(OCF_2CF(CF_3))_eO(CF_2)_2CF_3 \quad (43)$$

A catalyst incorporated to the catalyst layer of a cathode in the present invention, is not particularly limited. For example, a catalyst having a platinum group metal such as platinum or its alloy supported on carbon, is preferred.

Further, in the catalyst layer of a cathode, the range of the mass ratio of the catalyst to the solid polymer electrolyte material is preferably such that mass of the catalyst (total mass of metal and the carbon carrier): mass of the solid polymer electrolyte material=20:80 to 95:5, more preferably 30:70 to 90:10.

Here, if the content of the catalyst to the solid polymer electrolyte material is too low, the amount of the catalyst is small, whereby the reaction sites tend to be deficient. Further, the covering layer of the solid polymer electrolyte material which covers the catalyst, tends to be thick, whereby the diffusion rate of the reaction gas in the solid polymer electrolyte material tends to be small. Further, pores required for the diffusion of the reaction gas are likely to be clogged with the resin, whereby a phenomenon of flooding is likely to occur. On the other hand, if the content of the catalyst to the solid polymer electrolyte material is too high, the amount of the solid polymer electrolyte material covering the catalyst tends to be inadequate to the catalyst, whereby the reaction sites tend to be less, and the cell output tends to be low. Further, the solid polymer electrolyte material functions also as a binder for the catalyst layer and an adhesive between the catalyst layer and the polymer electrolyte membrane, but such a function tends to be inadequate, whereby the structure of the catalyst layer tends to be hardly maintained stably.

The construction of the catalyst layer of an anode in this fuel cell is not particularly limited, and it can be constituted in the same manner as a catalyst layer of an anode in a conventional solid polymer fuel cell. It may contain the solid polymer electrolyte material of the present invention, and it may contain other resin.

The thickness of the catalyst layer of the cathode and anode in the present invention is preferably from 1 to 500 μm, more preferably from 5 to 100 μm. Further, the catalyst layer in the present invention may contain a water repellent agent such as PTFE, as the case requires. However, the water repellent agent is an insulating material, and accordingly, its amount is preferably as small as possible, and it is usually preferably at most 30 mass %.

The polymer electrolyte membrane to be used for the solid polymer fuel cell of the present invention is not limited so long as it is an ion exchange membrane showing good proton conductivity in a wet state, but a perfluorinated membrane is preferred from the viewpoint of durability. As the solid polymer material constituting the polymer electrolyte membrane, the solid polymer electrolyte material of the present invention may, for example, be employed, or an ion exchange resin which is used in a conventional solid polymer fuel cell, may be employed.

Now, an example of the method for producing a fluoropolymer to be used for a solid polymer electrolyte material in the present invention, will be described. Firstly, as the fluoromonomer B, one having a —SO$_2$F group or a —SO$_2$Cl group, is used. The polymerization reaction of the fluoromonomer A and the fluoromonomer B is not particularly limited so long as it is carried out under a condition where radicals will be formed. For example, it may be carried out by bulk polymerization, solution polymerization, suspension polymerization, emulsion polymerization or polymerization in liquid or super critical carbon dioxide. The method for generating radicals is not particularly limited, and for example, a method of irradiating a radiation such as ultraviolet rays, γ-rays or electron rays, may be employed, or a method of using a radical initiator to be used in usual radical polymerization, may be employed. The reaction temperature for the polymerization reaction is also not particularly limited, and for example, it is usually from 15 to 150° C. In a case where a radical initiator is used, the radical initiator may, for example, be a bis(fluoroacyl) peroxide, a bis(chlorofluoroacyl) peroxide, a dialkylperoxy dicarbonate, a diacyl peroxide, a peroxy ester, an azo compound or a persulfate.

In a case where solution polymerization is carried out, the solvent to be used usually preferably has a boiling point of from 20 to 350° C. from the viewpoint of handling efficiency, more preferably has a boiling point of from 40 to 150° C. And, in the solvent, predetermined amounts of the fluoromonomer and the fluorovinyl compound are put, and a radical initiator is added to let radicals form to carry out the polymerization. Here, a useful solvent may, for example, be (i) a polyfluorotrialkylamine compound such as perfluorotributylamine or perfluorotripropylamine, (ii) a fluoroalkane such as perfluorohexane, perfluorooctane, perfluorodecane, perfluorododecane, perfluoro(2,7-dimethyloctane), 2H,3H-perfluoropentane, 1H-perfluorohexane, 1H-perfluorooctane, 1H-perfluorodecane, 1H,4H-perfluorobutane, 1H,1H,1H, 2H,2H-perfluorohexane, 1H,1H,1H,2H,2H-perfluorooctane, 1H,1H,1H,2H,2H-perfluorodecane, 3H,4H-perfluoro(2-methylpentane) or 2H,3H-perfluoro(2-methylpentane), (iii) a chlorofluoroalkane such as 3,3-dichloro-1,1,1,2,2-pentafluoropropane, 1,3-dichloro-1,1,2,2,3-pentafluoropropane or 1,1-dichloro-1-fluoroethane, (iv) a fluoroolefin having no double bond at the terminal of the molecular chain, such as a dimer of hexafluoropropene or a trimer of hexafluoropropene, (v) a polyfluorocycloalkane such as perfluorodecalin, perfluorocyclohexane, perfluoro(1,2-dimethylcyclohexane), perfluoro(1,3-dimethylcyclohexane), perfluoro(1,3,5-trimethylcyclohexane) or perfluorodimethylcyclobutane (irrespective of the structural isomerism), (vi) a polyfluorocyclic ether compound such as perfluoro(2-butyltetrahydrofuran), (vii) a hydrofluoroether such as n-$C_3F_7OCH_3$, n-$C_3F_7OCH_2CF_3$, n-$C_3F_7OCHFCF_3$, n-$C_3F_7OC_2H_6$, n-$C_4F_9OCH_3$, iso-$C_4F_9OCH_3$, n-$C_4F_9OC_2H_5$, iso-$C_4F_9OC_2H_5$, n-$C_4F_9OCH_2CF_3$, n-$C_5F_{11}OCH_3$, n-$C_6F_{13}OCH_3$, n-$C_5F_{11}OC_2H_5$, $CF_3OCF(CF_3)CF_2OCH_3$, $CF_3OCHFCH_2OCH_3$, $CF_3OCHFCH_2OC_2H_5$ or n-$C_3F_7OCF_2CF(CF_3)OCHFCF_3$, (viii) a fluorine-containing low molecular weight polyether, or (ix) tert-butanol or the like. These solvents may be used alone or in combination as a mixture of two or more of them.

Another example of the solvent to be used for the solution polymerization may be a chlorofluorocarbon such as 1,1,2-trichloro-1,2,2-trifluoroethane, 1,1,1-trichloro-2,2,2-trifluoroethane, 1,1,1,3-tetrachloro-2,2,3,3-tetrafluoropropane or 1,1,3,4-tetrachloro-1,2,2,3,4,4-hexafluorobutane. Such a chlorofluorocarbon may be technically useful, but its use is not desirable when the influence to the global environment is taken into consideration.

The copolymer obtainable by the polymerization has a —$SO_2F$ group or a —$SO_2Cl$ group, and accordingly, it is subjected to hydrolysis or that followed by acid-modification treatment, as the case requires to convert the group to a —$SO_3M$ group.

Now, with respect to the solid polymer fuel cell of the present invention, an example of the method for its production will be described, and at the same time, a preferred embodiment in which the liquid composition of the present invention is applied to the solid polymer fuel cell, will be described. The method for preparing a gas diffusion electrode having a catalyst layer of a cathode and anode for the solid polymer fuel cell of the present invention, is not particularly limited, and it can be prepared by a conventional method.

For example, the catalyst layer of a cathode can be formed by using a coating fluid for forming a catalyst layer, which is prepared by mixing a catalyst with a liquid composition having the solid polymer electrolyte material of the present invention having a —$SO_3H$ group, dissolved or dispersed in a solvent having a hydroxyl group in its molecule.

The solid polymer electrolyte material of the present invention can be well dissolved or dispersed in an organic solvent having a hydroxyl group, in a case where it has a —$SO_3M$ group. The organic solvent having a hydroxyl group is not particularly limited, but it is preferably an organic solvent having an alcoholic hydroxyl group. The organic solvent having an alcoholic hydroxyl group may, for example, be methanol, ethanol, 1-propanol, 2-propanol, 2,2,2-trifluoroethanol, 2,2,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol. Further, as an organic solvent other than an alcohol, an organic solvent having a carboxyl group such as acetic acid, may also be used.

Here, as the organic solvent having a hydroxyl group, the above-mentioned solvents may be used alone or in combination as a mixture of two or more of them. Further, it may be used as mixed with water or with other fluorine-containing solvents. As such other fluorine-containing solvents, fluorine-containing solvents exemplified as preferred fluorine-containing solvents in the solution polymerization reaction in the production of the above-described solid polymer electrolyte material, may be mentioned as examples. When the organic solvent having a hydroxyl group is used as a mixed solvent with water or another fluorine-containing solvent, the content of the organic solvent having a hydroxyl group is preferably at least 10%, more preferably at least 20%, based on the total mass of the solvent. In such a case, the solid polymer electrolyte material may be dissolved or dispersed in the mixed solvent from the beginning. Otherwise, firstly, the solid polymer electrolyte material may be dissolved or dispersed in the organic solvent having a hydroxyl group, and then, water or another fluorine-containing solvent may be mixed thereto. Further, dissolution or dispersion of the solid polymer electrolyte material in such a solvent is preferably carried out within a temperature range of from 0 to 250° C., more preferably within a range of from 20 to 150° C. under atmospheric pressure or under such a condition as closed and pressurized by e.g. an autoclave.

The content of the solid polymer electrolyte material in the liquid composition of the present invention is preferably from 1 to 50%, more preferably from 3 to 30%, based on the total mass of the liquid composition. If the content of the solid polymer electrolyte material is less than 1%, when a catalyst is mixed to this liquid to prepare a coating solution, which is used for preparation of a catalyst layer of a cathode, the number of coating steps will have to be increased to prepare a catalyst layer having a desired thickness, or a large amount of an organic solvent is contained in such a coating solution, such being costly, and it takes time to remove such an organic solvent, whereby the production operation can hardly be efficiently carried out. On the other hand, if the content of the solid polymer electrolyte material exceeds 50%, the viscosity of the liquid composition tends to be too high, whereby handling tends to be difficult.

Further, to the liquid composition, in addition to the solid polymer electrolyte material of the present invention, a resin which is another solid polymer electrolyte material, may be incorporated. In such a case, with a view to sufficiently securing water repellency and gas diffusibility in the catalyst layer obtained by using the liquid composition as the starting material, the content of the solid polymer electrolyte material of the present invention in the liquid composition is preferably at least 20%, more preferably at least 50%, based on the total mass of all the solid polymer electrolyte materials in the liquid composition.

The catalyst layer of a cathode can be prepared by coating a coating liquid for forming a catalyst layer, prepared by mixing a catalyst composed of fine particles of e.g. carbon black having platinum supported thereon, to the liquid composition of the present invention, on a polymer electrolyte membrane, a gas diffusion layer or a support plate so that the thickness will be uniform, the solvent is removed by drying, followed by hot pressing as the case requires. A coating liquid for a catalyst layer may also be prepared as follows. A liquid composition of the present invention is mixed with a catalyst of fine particles, the mixture thus obtained is dried and the dried solid is dispersed in another solvent which is usually selected from the above-mentioned alcoholic solvents, sometimes mixed with water. In such a manner, a catalyst layer of a cathode excellent in water repellency and gas diffusibility can be obtained. Especially when a coating solution is prepared from a liquid composition containing the solid polymer electrolyte material having the softening temperature of the polymer itself being at least 100° C., and then a catalyst layer is prepared therefrom, the gas diffusibility in the layer will be remarkably improved. It is considered that if the softening temperature of the solid polymer electrolyte material is at least 100° C., when the solvent is gradually evaporated from the coating solution, the solid polymer electrolyte material scarcely undergoes shrinkage, whereby pores having a proper size will be formed in the interior of the solid polymer electrolyte material or among agglomerates of catalyst particles coated by the solid polymer electrolyte material. Further, the catalyst layer of an anode can be formed in the same manner as the above catalyst layer of a cathode. The coating solution for forming the catalyst layer of an anode may be prepared by using the liquid composition of the present invention or by using a liquid having a conventional solid polymer electrolyte material dissolved or dispersed in a prescribed solvent.

By interposing the prepared catalyst layer of a cathode and the catalyst layer of an anode between a polymer electrolyte membrane and a gas diffusion layer, a solid polymer fuel cell can be prepared. Here, when the catalyst layer is formed on the polymer electrolyte membrane, a separately prepared gas diffusion layer may, for example, be placed or bonded on the catalyst layer. Otherwise, when the catalyst layer is formed on a gas diffusion layer to preliminarily form a gas diffusion electrode, a separately prepared polymer electrolyte membrane may be disposed or bonded on the catalyst layer. Further, when a catalyst layer is formed on a support plate, it may be transferred to a separately prepared polymer electrolyte membrane, then the support plate is peeled, and a separately prepared gas diffusion layer is disposed or bonded on the catalyst layer.

Bonding between the polymer electrolyte membrane and the catalyst layer, or the catalyst layer and the gas diffusion layer, may be carried out, for example, by hot press or roll press. At that time, the two may be bonded without heating by means of an adhesive such as a perfluorosulfonic acid polymer solution or the like, as the adhesive.

Further, as mentioned above, the polymer electrolyte membrane constituting a cell, may be prepared by using the solid polymer electrolyte material of the present invention.

In the foregoing, a preferred embodiment of the present invention has been described in detail, but the present invention is by no means restricted to the above-described embodiment. For example, in the above embodiment, a solid polymer fuel cell has been described in a case where a gas containing hydrogen as the main component is used as the anode reaction gas. However, the solid polymer fuel cell of the present invention may, for example, be one having a construction such that as the anode reaction gas, methanol gas is directly introduced to the anode.

Further, in the above embodiment, the liquid composition containing the solid polymer electrolyte material of the present invention is used for a catalyst layer of an electrode in a solid polymer fuel cell. However, it can be used for other applications. For example, when a membrane is formed by using the solid polymer electrolyte material of the present invention, it can be used in various electrochemical processes 1) as a cation permselective membrane to be used for e.g. electrolysis of sodium chloride, 2) as a membrane for electrolysis of water, 3) as a proton permselective membrane to be used, for production of hydrogen peroxide, for production of ozone or for recovery of waste acid, or 4) as a cation exchange membrane for electrodialysis to be used for desalination or salt production.

Further, for other than the electrochemical processes, a membrane may be formed by using the solid polymer electrolyte material of the present invention, and it may, for example, be used as a membrane for diffusion dialysis to be used for separation and purification of an acid, a base and a salt, as a charged porous membrane (a charged reverse osmosis membrane, a charged ultrafiltration membrane, a charged microfiltration membrane, etc.) for the separation of a protein, as a dehumidifying membrane or as a humidifying membrane. Further, the solid polymer electrolyte material of the present invention can be used also as e.g. a polymer electrolyte for a lithium ion cell, a solid acid catalyst, a cation exchange resin, a sensor employing a modified electrode, an ion exchange filter for removing a trace amount of ions in air, or an actuator.

Now, the solid polymer electrolyte material, the liquid composition, the solid polymer fuel cell and the fluoropolymer, of the present invention, will be described in further detail with reference to Examples and Comparative Examples. However, it should be understood that the present invention is by no means restricted to such Examples. In the following Examples and Comparative Examples, the following compounds will be represented by the following abbreviations.

PSVE: $CF_2=CFOCF_2CF(CF_3)OCF_2CF_2SO_2F$,
PSVE-H: $CF_2=CFOCF_2CF(CF_3)OCF_2CF_2SO_3H$,
BVE: Perfluoro(3-butenyl vinyl ether),
MMD: Perfluoro(2-methylene-4-methyl-1,3-dioxolane),
PDD: Perfluoro(2,2-dimethyl-1,3-dioxole),
TFE: Tetrafluoroethylene
IPP: $(CH_3)_2CHOC(=O)OOC(=O)OCH(CH_3)_2$,
HCFC141b: $CH_3CCl_2F$,
HCFC225cb: $CClF_2CF_2CHClF$.

PREPARATION EXAMPLE 1

PDD/PSVE-H Copolymer 1

Into a stainless steel autoclave having a capacity of 0.2 l, 26.0 g of PDD, 127.8 g of PSVE and 0.46 g of IPP were put, and the gas in the autoclave was purged by nitrogen, and thereafter, nitrogen was introduced so that the total pressure would be 0.3 MPa (gauge pressure). Then, the temperature in the autoclave was raised to be 40° C., and polymerization was initiated while stirring the content. After 10 hours from the initiation of the polymerization, the interior of the autoclave was cooled, and the gas in the interior was purged to stop the polymerization. After diluting with HCFC225cb, hexane was the resulting mixture was poured into hexane to precipitate the polymer, which was washed twice with hexane and further once with HCFC141b. After filtration, vacuum drying was carried out at 80° C. for 16 hours to obtain 41.6 g of a white polymer. The content of sulfur was obtained by an elemental analysis, and the molar ratio (PDD/PSVE) of the repeating unit based on PDD to the repeating unit based on PSVE in the polymer and $A_R$ were obtained, whereby PDD/PSVE=56.5/43.5, and $A_R$=1.31 meq/g. Further, the average molecular weight of the polymer was measured by GPC, whereby the number average molecular weight as calculated as polymethyl methacrylate was 33,000. The weight average molecular weight was 56,000.

Then, the obtained polymer was hydrolyzed in a KOH solution dissolved in a water/methanol mixture and then immersed in a dilute sulfuric acid aqueous solution for acid-form conversion treatment. Then, the polymer was washed with deionized water and dried, and then dissolved in ethanol to obtain a transparent ethanol solution containing 10 mass of the polymer (PDD/PSVE-H copolymer 1).

A cast film was prepared by using the ethanol solution of the above polymer, and the softening point of the polymer was measured by the above-mentioned penetration method by means of a quartz probe having a diameter of 1 mm. Firstly, a mixed solution comprising 10 parts by mass of the ethanol solution of the polymer and 2 parts by mass of butanol, was prepared, and this solution was used for cast-film forming at room temperature and dried at 160° C. for 30 minutes to obtain a cast film having a thickness of about 200 μm. Then, the obtained cast film was set in TMA (manufactured by Mack Science Company). And, while raising the temperature of the cast film at a temperature raising rate of 5° C./min, a vibration load based on a sin curve of 0.2 Hz (load vibration range: 1 to 6 g, average load: 3.5 g) was exerted to the contact portion between the cast film and the quartz probe having a diameter of 1 mm, whereby the change in the thickness of the cast film was measured. And, the temperature at which the thickness of the film started to abruptly decrease due to penetration of the probe into the cast film, was measured as the softening point. As a result, the softening point of this polymer was 150° C.

PREPARATION EXAMPLE 2

PDD/PSVE-H Copolymer 2

Into a stainless steel autoclave having a capacity of 0.2 l, 36.4 g of PDD, 123.1 g of PSVE and 0.48 g of IPP were put, and polymerization was initiated in the same manner as in Preparation Example 1. After 3.2 hours from the initiation of the polymerization, the interior of the autoclave was cooled, and the gas in the interior was purged to stop the polymerization. After diluting with HCFC225cb, the diluted product was put into hexane for precipitation, and the precipitate was washed twice with hexane and further once with HCFC141b. After filtration, vacuum drying was carried out at 80° C. for 16 hours to obtain 25.3 g of a white polymer. With respect to the obtained polymer, hydrolysis and acid-form conversion treatment were carried out in the same manner as in Preparation Example 1 to obtain a PDD/PSVE-H copolymer 2, and the same characterization as in Preparation 1 was carried out. As a result, PDD/PSVE=69.8/30.2, $A_R$=0.99 meq/g, the number average molecular weight as calculated as polymethyl methacrylate: 58,000, the weight average molecular weight: 95,000, and the softening point: 180° C.

PREPARATION EXAMPLE 3

BVE/PSVE-H Copolymer 1

In a nitrogen atmosphere, 120.0 g of BVE, 128.5 g of PSVE and 0.76 g of IPP were put into a flask having a capacity of 300 ml, and the temperature in the flask was raised to be 40° C. to initiate polymerization while stirring the content. After 16.7 hours from the initiation of the polymerization, the interior of the flask was cooled to stop the polymerization, and the product was put into hexane to precipitate the polymer, which was further washed three times with hexane. After filtration, vacuum drying was carried out at 80° C. for 16 hours to obtain 47.8 g of a white polymer. With respect to the obtained polymer, hydrolysis and acid-form conversion treatment were carried out in the same manner as in Preparation Example 1 to obtain a BVE/PSVE-H copolymer 1, and the same characterization as in Preparation Example 1 was carried out. As a result, BVE/PSVE=67.0/33.0, $A_R$=0.99 meq/g, the number average molecular weight as calculated as polymethyl methacrylate: 29,000, the weight average molecular weight: 42,000, and the softening temperature: 110° C.

PREPARATION EXAMPLE 4

BVE/PSVE-H Copolymer 2

In a nitrogen atmosphere, 150.0 g of BVE, 103.0 g of PSVE and 0.77 g of IPP were put into a flask having a capacity of 300 ml, and polymerization was initiated in the same manner as in Preparation Example 3. After 10.7 hours from the initiation of the polymerization, the interior of the flask was cooled to stop the polymerization, and the product was put into hexane to precipitate the polymer, which was washed three times with hexane and further once with HCFC141b. After filtration, vacuum drying was carried out at 80° C. for 16 hours to obtain 38.0 g of a white polymer. With respect to the obtained polymer, hydrolysis and acid-form conversion treatment were carried out in the same manner as in Preparation Example 1 to obtain a BVE/PSVE-H copolymer 2, and the same characterization as in Preparation Example 1 was carried out. As a result, BVE/PSVE=76.1/23.9, $A_R$=0.75 meq/g, the number average molecular weight as calculated as polymethyl methacrylate: 38,000, the weight average molecular weight: 53,000, and the softening temperature: 110° C.

PREPARATION EXAMPLE 5

TFE/PSVE-H Copolymer

A TFE/PSVE copolymer which has heretofore been employed as a material for a catalyst layer of an electrode in a solid polymer fuel cell or as a material for a polymer electrolyte membrane, was prepared by a known method. With respect to the obtained polymer, hydrolysis and acid-form conversion treatment were carried out in the same manner as in Preparation Example 1 to obtain a TFE/PSVE-H copolymer, and the same characterization as in Preparation Example 1 was carried out, whereby TFE/PSVE=82.2/17.8, $A_R$=1.1 meq/g, and the softening temperature: 80° C.

PREPARATION EXAMPLE 6

MMD/PSVE-H Copolymer 1)

Into a 0.2 l autoclave, 0.68 g of IPP, 207.1 g of PSVE and 20.0 g of MMD were put, and after degassing under reduced pressure, raising pressure with nitrogen followed by purging was carried out three times, whereupon nitrogen was introduced so that the total pressure would be 0.12 MPa (gauge pressure). Then, the temperature of the autoclave was raised to 40° C., and the reaction was carried out for 2.5 hours. The polymerization solution was put into hexane for precipitation, followed by further washing three times with hexane. Vacuum drying was carried out at room temperature overnight, and further vacuum drying was carried out at 80° C. overnight to obtain 16.9 g of a polymer (yield: 7.4%).

The content of sulfur was obtained by an elemental analysis, and the molar ratio (MMD/PSVE) of the repeating unit based on MMD to the repeating unit based on PSVE in the polymer, and $A_R$ were obtained, whereby MMD/PSVE=76.0/24.0, and $A_R$=0.82 meq/g. Further, the molecular weight of the polymer was measured by GPC, whereby the number average molecular weight as calculated as polymethyl methacrylate was 45,000, and the weight average molecular weight was 70,000.

Then, the obtained polymer was immersed in a solution of KOH/$H_2O$/DMSO=11/59/30 (mass ratio) and maintained at 90° C. for 7 days. After cooling to room temperature, the polymer was washed with water and further immersed in water at 90° C. This washing with water was repeated three times. Further, it was immersed in 1N hydrochloric acid at 90° C. for one day, and after cooling to room temperature, it was washed with water and further immersed in water at 90° C. This washing with water was repeated three times. Then, it was dried at 80° C. for 16 hours in an oven and further vacuum-dried at 80° C. to obtain an acid-form converted MMD/PSVE-H copolymer.

In the same manner as in Preparation Example 1, an ethanol solution containing 10 mass % of this polymer was prepared, a cast film was prepared, and the softening temperature was measured and found to be 135° C.

PREPARATION EXAMPLE 7

MMD/PSVE-H Copolymer 2

19.6 g of a polymer was obtained (yield: 8.9%) in the same manner as in Preparation Example 6 except that PSVE charged was 207.1 g, MMD was 13.3 g, nitrogen was introduced to bring the total pressure to 0.11 MPa (gauge pressure), and the reaction time was changed to 6 hours. In the same manner as in Preparation Example 6, the molar ratio (MMD/PSVE) of the repeating unit based on MMD to the repeating unit based on PSVE in the polymer, and $A_R$, were obtained, whereby MMD/PSVE=66.7/33.3, and $A_R$=1.07 meq/g. Further, the number average molecular weight as calculated as polymethyl methacrylate was 24,000, and the weight average molecular weight was 39,000.

The above polymer was acid-form converted in the same manner as in Preparation Example 6 to obtain a MMD/PSVE-H copolymer. In the same manner as in Preparation Example 1, an ethanol solution containing 9.6 mass % of this polymer was prepared, a cast film was prepared, and the softening point was measured and was found to be 125° C.

PREPARATION EXAMPLE 8

TFE/PDD/PSVE-H Copolymer

Into a 0.2 l autoclave, 14.3 g of PDD, 52.6 g of PSVE, 76.9 g of HCFC225cb and 0.36 g of IPP were put and freeze-deaerated. After introducing 5.9 g of TFE, the temperature was raised to 40° C. to initiate polymerization. The pressure at that time was 0.26 MPa (gauge pressure). The reaction was carried out at 40° C. for 10 hours, and when the pressure became 0.07 MPa (gauge pressure), the reaction was terminated. The polymerization solution was put into hexane for precipitation, followed by washing with hexane for three times. Vacuum drying was carried out at 80° C. overnight to obtain 25.0 g of a polymer (yield: 34.40).

By $^{19}$F-NMR, the molar ratio (TFE/PDD/PSVE) of the repeating unit based on TFE, the repeating unit based on PDD and the repeating unit based on PSVE in the polymer was obtained, whereby TFE/PDD/PSVE=42/35/22, and $A_R$ was 0.98 meq/g. Further, the number average molecular weight as calculated as polymethyl methacrylate, by GPC, was 53,000 and the weight average molecular weight was 83,000.

Then, the above polymer was pressed at 160° C. to obtain a film having a thickness of 100 μm. It was immersed in a solution of KOH/H$_2$O/DMSO=11/59/30 (mass ratio) and maintained at 90° C. for 17 hours for hydrolysis. Then, after cooling to room temperature, it was washed with water three times. Further, it was immersed in 2N sulfuric acid at room temperature for 2 hours and then washed with water. This immersion in sulfuric acid and washing with water were carried out in a total of three times each, and finally washing with water was carried out three times. Drying at 80° C. for 16 hours in an oven was carried out, and further, vacuum drying at 80° C. was carried out to obtain a dry film made of an acid-form converted TFE/PDD/PSVE-H copolymer. The softening temperature was measured by the same method as in Preparation Example 1 and was found to be 120° C. Further, the maximum stress in the tensile test was 6.1 MPa and the elongation at breakage was 3.0%. It was confirmed that the film had a sufficient strength even when used as a polymer electrolyte membrane for a fuel cell.

Further, with respect to the above acid-form converted polymer, the same operation as in Preparation Example 1 was carried out to obtain a 14.5 mass % ethanol solution.

The above tensile test of the film was carried out by cutting out the film in the shape of test specimen type 2 as stipulated in JIS K-7127 (length: 150 mm, width: 10 mm, gauge length: 50 mm) and measuring under such conditions that the initial distance between chucks of 100 mm, a tensile speed of 50 mm/min at 25° C. under a relative humidity of 50%.

EXAMPLE 1

A unit cell of Example 1 was prepared by the following procedure. Firstly, carbon having Pt supported thereon (amount of Pt supported: 54 mass %) was dispersed in an ethanol solution containing 10 mass % of the PDD/PSVE-H copolymer to prepare a dispersion (mass of the carbon having Pt supported thereon: mass of the above copolymer=6:4). Then, the dispersion was sufficiently stirred and then further evaporated to dryness to obtain a solid product, which was pulverized. Then, this powder was re-dispersed in 2,2,3,3,3-pentafluoro-1-propanol to obtain a coating liquid for forming a catalyst layer of a cathode, wherein the solid content concentration was 5 mass %.

Then, the carbon having Pt supported thereon (amount of Pt supported: 40 mass %) was mixed and dispersed in ethanol and an ethanol solution containing 9 mass % of the TFE/PSVE-H copolymer ($A_R$=1.1 meq/g), and water was further added to obtain a coating solution for forming a catalyst layer of an anode wherein the solid content concentration was 8 mass % (mass of ethanol:mass of water=1:1, mass of the carbon having Pt supported thereon:mass of the above copolymer=7:3).

Further, as a gas diffusion layer for an anode and a cathode, a water repellent carbon powder layer (a mixture of carbon black and PTFE) was loaded on one side of a water repellent carbon cloth (fiber woven fabric) and further hot pressing was applied to obtain one having a thickness of about 340 μm with the carbon powder layer surface to be attached to the catalyst layer formed, made flat. Further, as a polymer electrolyte membrane, a polymer electrolyte membrane made of a sulfonic acid type perfluorocarbon polymer (FLEMION HR, trade name, manufactured by Asahi Glass Company, Limited, $A_R$=1.1 meq/g, dry film thickness: 50 μm) was prepared.

Then, a coating liquid for forming the catalyst layer of a cathode was coated once on the water repellent carbon powder layer side of the above gas diffusion layer, so that the amount of Pt would be 0.8 mg/cm$^2$, followed by drying to form a catalyst layer, thereby to obtain a cathode. On the other hand, in the same manner as the cathode, the coating liquid for forming the catalyst layer of an anode was coated once on the water repellent carbon powder layer side of the above gas diffusion layer sheet so that the amount of Pt would be 0.5 mg/cm$^2$, followed by drying to form a catalyst layer thereby to obtain an anode.

Then, the obtained cathode and anode were cut out so that the effective electrode area would be 25 cm$^2$. And, the cathode and the anode were disposed so that the respective catalyst layers were located inside and faced each other, and a polymer electrolyte membrane was interposed therebetween, and hot pressing was carried out in that state to bond the respective catalyst layers of the cathode and anode with the polymer electrolyte membrane to obtain a membrane electrode assembly.

COMPARATIVE EXAMPLE 1

A membrane electrode assembly was prepared in the same manner as in Example 1 except that both the anode and the cathode were prepared by using the coating solution for forming the catalyst layer of an anode, prepared in Example 1.

Fuel Cell Performance Evaluation

To each of the membrane electrode assemblies of Example 1 and Comparative Example 1, a separator made of carbon and having a gas flow path formed was mounted to obtain a cell for measurement, and using an electron load (FK400L, manufactured by Takasago Seisakusho K.K.) and a direct current power source (EX 750L, manufactured by Takasago Seisakusho K.K.), a current voltage characteristic test of the cell for measurement, was carried out. The measuring conditions were such that the hydrogen inlet pressure: 0.15 MPa, the air inlet pressure: 0.15 MPa, the operation temperature of the cell: 80° C., and the cell voltage (iR free) was measured upon expiration of 10 hours after the operation at an output current density of 0.3 A/cm$^2$ and 1.0 A/cm$^2$, respectively. Further, the flow rates of the hydrogen gas and the air were adjusted so that the hydrogen utilization rate would be 70%, and the air utilization ratio would be 40%, under the operation conditions. The results are shown in Table 1.

TABLE 1

| | Cell characteristics | |
| --- | --- | --- |
| | Cell voltage upon expiration of 10 hours from the initiation of the operation (iR free)/mV at 0.3 A · cm$^{-2}$ | Cell voltage upon expiration of 10 hours from the initiation of the operation (iR free)/mV at 1 A · cm$^{-2}$ |
| Example 1 | 820 | 725 |
| Comparative Example 1 | 770 | 680 |

According to the present invention, a repeating unit having an alicyclic structure is introduced in a copolymer for a solid polymer electrolyte material, whereby it is possible to provide a solid polymer electrolyte material having good ionic conductivity and water repellency and being excellent in gas permeability, a liquid composition containing such a material and a solid polymer fuel cell capable of providing a high cell output constantly.

Further, the solid polymer electrolyte material of the present invention has a softening temperature higher than the conventional material, and thus has a feature that it can be used at a high temperature when it is used as an ion permselective membrane, a reverse osmosis membrane, a filtration membrane, a diaphragm, etc. in other electrochemical processes as well as a solid polymer fuel cell.

The entire disclosure of Japanese Patent Application No. 2000-395511 filed on Dec. 26, 2000 including specification, claims and summary are incorporated herein by reference in its entirety.

What is claimed is:

1. A solid polymer electrolyte material made of a copolymer comprising a repeating unit based on a fluoromonomer A which gives a polymer having an alicyclic structure in its main chain by radical polymerization, and a repeating unit based on a fluoromonomer B of the following formula (1), wherein the repeating unit based on a fluoromonomer A is represented by the following formula (4):

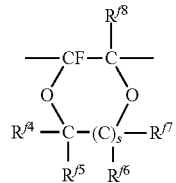

(4)

wherein s is 0 or 1, each of $R^{f4}$, $R^{f5}$, $R^{f6}$ and $R^{f7}$, which may be the same or different, is a fluorine atom or to a $C_{1-5}$ perfluoroalkyl group (provided that $R^{f4}$ and $R^{f5}$ may be connected to form a spiro ring when s is 0), and $R^{f8}$ is a fluorine atom, a $C_{1-5}$ perfluoroalkyl group or a $C_{1-5}$ perfluoroalkoxy group;

$$CF_2{=}CF(R^f)_j SO_2 X \qquad (1)$$

wherein j is 0 or 1, X is a fluorine atom, a chlorine atom or OM {wherein M is a hydrogen atom, an alkali metal atom or a group of $NR^1R^2R^3R^4$ (wherein each of $R^1$, $R^2$, $R^3$ and $R^4$ which may be the same or different, is a hydrogen atom or a monovalent organic group)}, and $R^f$ is a $C_{1-20}$ polyfluoroalkylene group having a straight chain or branched structure which optionally contains at least one ether oxygen atom.

2. The solid polymer electrolyte material according to claim 1, wherein the fluoromonomer B is represented by the following formula (2):

$$CF_2{=}CFO(CF_2CFYO)_k(CF_2)_m SO_2 X \qquad (2)$$

wherein k is an integer of from 0 to 2, m is an integer of from 1 to 12, Y is a fluorine atom or a trifluoromethyl group, and X is a hydrogen atom, a chlorine atom or OM {wherein M is a hydrogen atom, an alkali metal atom or a group of $NR^1R^2R^3R^4$ (wherein each of $R^1$, $R^2$, $R^3$ and $R^4$ which may be the same or different, is a hydrogen atom or a monovalent organic group)}.

3. The solid polymer electrolyte material according to claim 1, wherein the fluoromonomer A is perfluoro(2,2-dimethyl-1,3-dioxole).

4. The solid polymer electrolyte material according to claim 3, wherein the fluoromonomer B is represented by the following formula (2):

$$CF_2{=}CFO(CF_2CFYO)_k(CF_2)_m SO_2 X \qquad (2)$$

wherein k is an integer of from 0 to 2, m is an integer of from 1 to 12, Y is a fluorine atom or a trifluoromethyl group, where X is a fluorine atom, a chlorine atom or OM {wherein M is a hydrogen atom, an alkali metal atom or a group of $NR^1R^2R^3R^4$ (wherein each of $R^1$, $R^2$, $R^3$ and $R^4$ which may be the same or different, is a hydrogen atom or a monovalent organic group)}.

5. The solid polymer electrolyte material according to claim 1, wherein the fluoromonomer A is perfluoro(1,3-dioxole).

6. The solid polymer electrolyte material according to claim 5, wherein the fluoromonomer B is represented by is the following formula (2):

$$CF_2{=}CFO(CF_2CFYO)_k(CF_2)_m SO_2 X \qquad (2)$$

wherein k is an integer of from 0 to 2, m is an integer of from 1 to 12, Y is a fluorine atom or a trifluoromethyl group, and X is a fluorine atom, a chlorine atom or OM {wherein M is a hydrogen atom, an alkali metal atom or a group of $NR^1R^2R^3R^4$ (wherein each of $R^1$, $R^2$, $R^3$ and R[4] which may be the same or different, is a hydrogen atom or a monovalent organic group)}.

7. The solid polymer electrolyte material according to claim 1, wherein the fluoromonomer A is 2,2,4-trifluoro-5-trifluoromethoxy-1,3-dioxole.

8. The solid polymer electrolyte material according to claim 7, wherein the fluoromonomer B is represented by the following formula (2):

$$CF_2=CFO(CF_2CFYO)_k(CF_2)_mSO_2X \qquad (2)$$

wherein k is an integer of from 0 to 2, m is an integer of from 1 to 12, Y is a fluorine atom or a trifluoromethyl group, and X is a fluorine atom. a chlorine atom or OM {wherein M is a hydrogen atom, an alkali metal atom or a group of $NR^1R^2R^3R^4$ {wherein each of $R^1$, $R^2$, $R^3$ and $R^4$ which may be the same or different, is a hydrogen atom or a monovalent organic group)}.

9. The solid polymer electrolyte material according to claim 1, which has an ion exchange capacity of from 0.9 to 1.5 meq/g dry resin.

10. The solid polymer electrolyte material according to claim 2, which has an ion exchange capacity of from 0.9 to 1.5 meq/g dry resin.

11. The solid polymer electrolyte material according to claim 3, which has an ion exchange capacity of from 0.9 to 1.5 meq/g dry resin.

12. The solid polymer electrolyte material according to claim 4, which has an ion exchange capacity of from 0.9 to 1.5 meq/g dry resin.

13. The solid polymer electrolyte material according to claim 5, which has an ion exchange capacity of from 0.9 to 1.5 meq/g dry resin.

14. The solid polymer electrolyte material according to claim 6, which has an ion exchange capacity of from 0.9 to 1.5 meq/g dry resin.

15. The solid polymer electrolyte material according to claim 7, which has an ion exchange capacity of from 0.9 to 1.5 meq/g dry resin.

16. The solid polymer electrolyte material according to claim 8, which has an ion exchange capacity of from 0.9 to 1.5 meq/g dry resin.

* * * * *